Sept. 12, 1939.   A. KUHNS ET AL   2,172,662
FLEXIBLE COUPLING
Filed Aug. 29, 1938
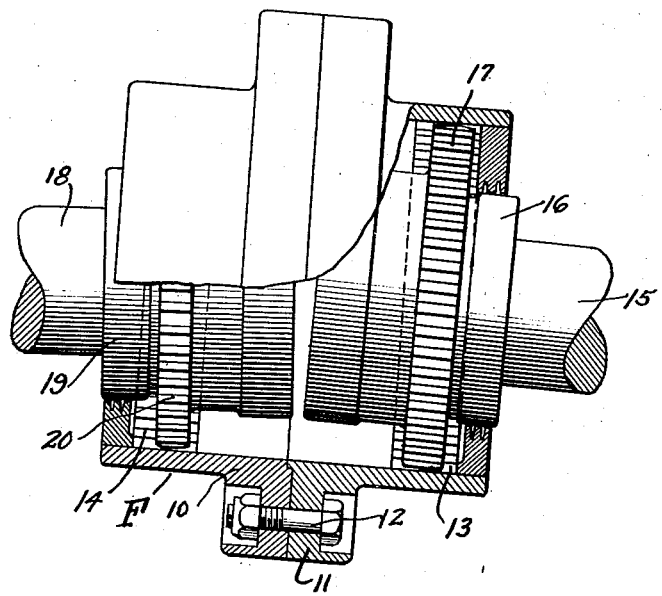
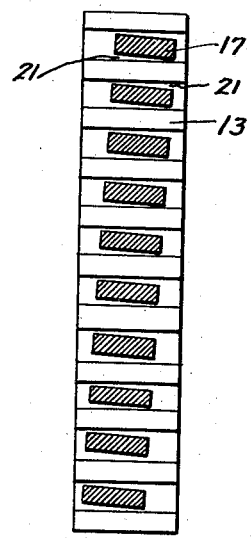
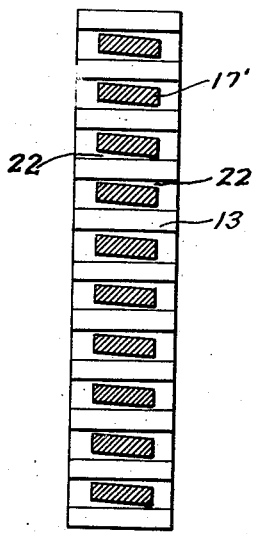
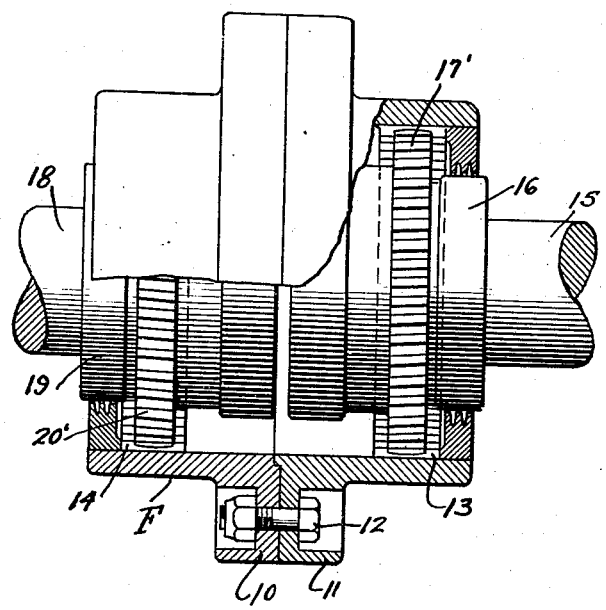
Inventors
Austin Kuhns.
Emil R. Gasser.

Patented Sept. 12, 1939

2,172,662

UNITED STATES PATENT OFFICE 2,172,662

FLEXIBLE COUPLING

Austin Kuhns and Emil R. Gasser, Buffalo, N. Y., assignors to Farrel-Birmingham Company Incorporated, Buffalo, N. Y., a corporation of Connecticut Application August 29, 1938, Serial No. 227,251

1 Claim. (Cl. 64—9)

This invention relates to flexible couplings, particularly couplings of the type in which teeth on the ends of the hubs of axially opposed shafts mesh with teeth in a coupling frame surrounding the hubs, this type of coupling being extensively used in power transmission systems as for example in the driving of marine craft propellers from driving sources such as turbines.

Heretofore in couplings of this type, the primary setting was such that the teeth on the shaft hubs and within the coupling frame were parallel with each other and driving under heavy conditions resulted in considerable friction between the meshing teeth faces owing to breakdown of the lubricating oil film which permitted metallic contact or so-called seizing.

We have discovered that the performance of this type of couplings can be materially improved by an arrangement which will position the driving and driven teeth at a slight angle with each other to thereby take the benefit of what is known in lubrication as the "Kingsbury" effect. The operation will be such that as the faces of the meshing teeth move in rotation or relatively back and forth during axial displacement of the coupling members, the included angles between the faces will produce a wedging action on the oil film and build up the pressure and prevent a breakdown of the oil film and consequently will prevent seizing of the coupling faces. The beneficial result will be increase in strength of the oil film separating the driving faces, increase in load carrying capacity, in freedom of motion both axially and to compensate for misalignment.

Our improved arrangement is incorporated in the structure disclosed on the drawing, in which drawing:

Figure 1 is a side elevation, partly in section, of a coupling structure;

Figure 2 is a more or less diagrammatic developed view showing part of the coupling frame gear teeth and the arrangement of the teeth on one of the shaft hubs;

Figure 3 is a view similar to Figure 1 showing a modified arrangement; and

Figure 4 is a view like Figure 2 to more clearly show the operation of the structure of Figure 3.

The coupling structure shown comprises a coupling frame F which may be composed of two parts 10 and 11 secured together as by bolt 12. At its opposite ends this coupling frame has the internal teeth 13 and 14 respectively, these teeth extending parallel with the axis of the frame.

A shaft 15 has the hub 16 surrounded by teeth 17 which mesh with the teeth 13 in the coupling frame. The shaft 18 has the hub 19 surrounded by teeth 20 which mesh with the teeth 14 of the coupling frame. The teeth 17 and 20 extend parallel with the axis of the respective shafts 15 and 18.

In accordance with our improved arrangement and as shown by Figures 1 and 2, the coupling structure is primarily set up so that the shafts 15 and 18 have their axes at a slight angle with each other so that the shaft teeth will no longer be parallel with the coupling frame teeth but will be at a slight angle relative thereto.

The teeth of the coupling frame are of greater axial extent than the teeth on the shaft hubs so that, with the arrangement shown, when the coupling structure rotates the shaft hub teeth will move in axial direction relative to the coupling frame teeth. The operation is diagrammatically shown by Figure 2, which shows the cooperation of the teeth 17 and the teeth 13. As the coupling structure rotates each shaft tooth 17 will oscillate axially in engagement with the teeth 13 and, as the faces of the teeth 17 are at an angle with the faces of the teeth 13, the friction drag of the faces on the lubricant will cause the lubricant to be forced or wedged into the tapering spaces 21 between the teeth toward the narrow end of the spaces to generate a pressure which will tend to hold the faces apart against metallic contact or seizing and to maintain an adequate lubricating oil film between the faces, the result being what is known in lubrication as the "Kingsbury" effect. During axial oscillation or misalignment of the shaft this "Kingsbury" effect will prevent metallic contact or seizing of the meshing teeth.

In the modified arrangement of Figures 3 and 4, the structure is the same as in Figure 1 except that the teeth 17' and 20' on the shaft hubs 16 and 19 respectively are inclined or set at a slight angle with the shaft axes, or in other words, these teeth will have a slight helical angle. With this tooth arrangement, when the coupling structure is primarily set, the shafts 15 and 18 may be supported with their axes coincident. With this arrangement, any axial oscillation or displacement of the shafts 15 and 18 relative to each other or relative to the coupling frame F will result in wedging of the lubricating oil into the tapered spaces 22 between the faces of the shaft teeth and the coupling frame teeth and we will have the "Kingsbury" effect which will prevent metallic contact or seizure of the teeth.

With either arrangement of Figures 1 and 3, as the coupling elements shift or oscillate relatively axially during operation of the coupling structure, the "Kingsbury" effect resulting from our improved relative arrangement of the teeth will prevent metallic contact or rubbing of the meshing teeth and ample lubricating oil film will be maintained and assured between the teeth surfaces. With such prevention of metallic rubbing or seizure and the assurance of an adequate lubricating oil film, the coupling members may move with greater freedom together and relatively with material increase in load carrying capacity.

We have shown a practical and efficient embodiment of our invention but we do not desire to be limited to the exact structure and arrangement shown and described as changes and modifications may be made without departing from the scope of the invention.

We claim as follows:

A coupling structure of the class described comprising a coupling frame having internal teeth extending parallel with the frame axis, shafts extending into the ends of said frame and having teeth meshing with the frame teeth, said frame and shafts being adapted for relative axial displacement, the teeth on the shafts extending at a slight angle with the respective shaft axes to provide tapering or wedge spaces between the bearing faces of the meshing teeth into which lubricating oil is forced during operation of the coupling for maintenance of the lubricating oil film and to prevent metallic contact or seizing of the meshing teeth.

AUSTIN KUHNS.
EMIL R. GASSER.